United States Patent

Andou

(10) Patent No.: US 9,694,763 B2
(45) Date of Patent: Jul. 4, 2017

(54) WIRE HARNESS PROTECTOR HAVING GROUNDING FUNCTION

(71) Applicant: Sumitomo Wiring Systems, Ltd., Yokkaichi, Mie (JP)

(72) Inventor: Yuusuke Andou, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/134,451

(22) Filed: Apr. 21, 2016

(65) Prior Publication Data

US 2016/0315421 A1 Oct. 27, 2016

(30) Foreign Application Priority Data

Apr. 24, 2015 (JP) ................................. 2015-089701

(51) Int. Cl.
*H01R 4/64* (2006.01)
*B60R 16/02* (2006.01)
*H01R 11/12* (2006.01)

(52) U.S. Cl.
CPC ............ *B60R 16/0215* (2013.01); *H01R 4/64* (2013.01); *H01R 11/12* (2013.01); *H01R 2201/26* (2013.01)

(58) Field of Classification Search
USPC ........................................ 174/72 A; 439/410
See application file for complete search history.

(56) References Cited

U.S. PATENT DOCUMENTS

| 8,013,248 B2 * | 9/2011 | Sakata ................ B60R 16/0215 174/40 CC |
| 2001/0029120 A1 * | 10/2001 | Miyazaki ........... H01R 13/4223 439/98 |
| 2004/0115973 A1 * | 6/2004 | Fujii ....................... H01R 4/64 439/97 |
| 2005/0118858 A1 * | 6/2005 | Matsui ..................... H01R 4/66 439/410 |
| 2013/0206928 A1 * | 8/2013 | Murakoshi .......... B60R 16/0215 248/73 |

FOREIGN PATENT DOCUMENTS

| JP | H0410964 U | 1/1992 |
| JP | H0580118 U | 10/1993 |
| JP | H0942541 A | 2/1997 |
| JP | 2012235623 A | 11/2012 |

* cited by examiner

*Primary Examiner* — Timothy Thompson
*Assistant Examiner* — Krystal Robinson
(74) *Attorney, Agent, or Firm* — Reising Ethington, P.C

(57) ABSTRACT

A wire harness protector having a grounding function and including a protector main body with a housing portion where a wire harness can be inserted and housed; a vehicle fixing portion protruding from the protector main body; and a conductive metal fitting where one end portion is configured to be fixed by bolting to the vehicle fixing portion and also to a vehicle body, and a ground terminal connecting portion is provided in another end portion. The wire harness protector is configured such that a ground terminal branched to extend from the wire harness can be connected to the ground terminal connecting portion, the ground terminal connecting portion includes a bolt-like portion protruding into the housing portion. The wire harness protector makes it possible to effectively improve assembly work efficiency, and possible to stabilize and suppress poor contact points.

10 Claims, 8 Drawing Sheets

WIRE HARNESS PROTECTOR HAVING GROUNDING FUNCTION

This Application claims the benefit of Japanese Application No. JP2015-089701, filed on Apr. 24, 2015, the contents of which are hereby incorporated by reference in their entirety.

FIELD

The present invention relates to a wire harness protector that, when installed, is placed over a wire harness configured to be routed in an automobile or the like, thereby protecting the wire harness, and more specifically relates to a wire harness protector provided with a function to form a ground connection of the wire harness to the vehicle body.

BACKGROUND

Conventionally, in an automobile or the like, a wire harness protector is used to protect the wire harness from interference by other members, and to hold the wire harness at a predetermined position in the vehicle. With this wire harness protector, for example, the wire harness is inserted through and housed in a housing portion of a protector main body, and the protector main body is fixed to the vehicle body through a vehicle fixing portion that protrudes from the protector main body, the wire harness is held at a predetermined position of the vehicle, and is protected by the wire harness protector.

Ordinarily, a ground terminal provided in the wire harness is connected to the vehicle body of the automobile to establish grounding.

However, when attempting to directly connect the ground terminal to the vehicle body, the length of a ground wire increases, so gross weight and cost of the wire harness increases, and there is a risk that the routing mode of the wire harness will be limited.

Consequently, the present applicant, in JP H4-10964U (Patent Document 1), has proposed a wire harness protector having a grounding function. That is, in the second and third drawings of Patent Document 1, in the wire harness protector, a conductive metal fitting is adopted where one end portion can be fixed by bolting to a vehicle body, and a ground terminal connecting portion is provided in another end portion, and a ground connection to the vehicle body can be realized by connecting the ground terminal connecting portion to a ground terminal. With this wire harness protector, it is possible to reduce the length of a ground wire by providing the ground terminal connecting portion within the housing portion.

However, with the wire harness protector disclosed in the second and third drawings of Patent Document 1, the ground terminal and the ground terminal connecting portion are connected by inserting a male terminal into a female terminal, and in the connection of the ground terminal with the ground terminal connecting portion, there is room for improvement with respect to work efficiency and certainty.

Here, the present design was made against the background of the circumstances described above, and aims to provide a wire harness protector having a grounding function with a new structure, whereby it is possible to effectively improve assembly work efficiency when forming a connection between a ground terminal and a ground connection terminal, and possible to stabilize and suppress poor contact points in this connection.

SUMMARY

In a first aspect, in a wire harness protector is provided having a grounding function, including a protector main body with a housing portion where a wire harness can be inserted and housed; a vehicle fixing portion protruding from the protector main body; and a conductive metal fitting where one end portion is configured to be fixed by bolting to the vehicle fixing portion and also to a vehicle body, and a ground terminal connecting portion is provided in another end portion, the wire harness protector being configured such that a ground terminal branched to extend from the wire harness can be connected to the ground terminal connecting portion, the ground terminal connecting portion includes a bolt-like portion protruding into the housing portion.

According to a wire harness protector having a structure according to this aspect, the ground terminal connecting portion includes a bolt-like portion protruding into the housing portion, so the connection of the ground terminal to the ground terminal connecting portion can be realized by placing the ground terminal over the bolt-like portion and fastening the ground terminal to the bolt-like portion by attaching a nut by screwing. Thus, the ground terminal and the ground terminal connecting portion can be easily and reliably connected. Therefore, it is possible to effectively improve the work efficiency of performing this connection, and possible to stabilize and suppress problems such as poor contact points.

Note that the bolt-like portion in this aspect is suitably configured by a stud bolt being inserted through the conductive metal fitting, but for example, the conductive metal fitting and the bolt-like portion may also be formed as a single body.

In a second aspect, there is provided the wire harness protector having a grounding function according to the first aspect, the conductive metal fitting and the bolt-like portion are insert molded to the protector main body.

According to a wire harness protector having a structure according to this aspect, the conductive metal fitting and the bolt-like portion are insert molded to the protector main body, so for example, even when transporting the wire harness protector after manufacturing, it is possible to effectively prevent the conductive metal fitting and the bolt-like portion from detaching from the protector main body due to vibration or the like.

In a third aspect, there is provided the wire harness protector having a grounding function according to the second aspect, the one end portion of the conductive metal fitting extends in a horizontal direction and the other end portion of the conductive metal fitting extends in the horizontal direction, and the one end portion and the other end portion are connected by a vertical wall portion that extends in a vertical direction.

According to a wire harness protector having a structure according to this aspect, the conductive metal fitting that can be insert molded to the protector main body is provided with the vertical wall portion that extends in the vertical direction, so the vertical wall portion is sandwiched by the protector main body from both sides in the plate thickness direction. Thus, when one end side of the conductive metal fitting is fixed by bolting to the vehicle fixing portion and also the vehicle body, even if rotational torque that accompanies bolt fastening is applied to the vertical wall portion, rotation of the vertical wall portion relative to the protector main body is limited. Therefore, application of rotational torque that accompanies bolt fastening that reaches to the other end side of the conductive metal fitting is avoided, and even when installing the wire harness protector to a vehicle body, it is possible to effectively prevent installation from affecting the connection of the ground terminal and the ground terminal connecting portion.

In a fourth aspect, there is provided the wire harness protector having a grounding function according to the first to third aspects, a partition wall portion is provided in the surroundings of the ground terminal connecting portion, and the ground terminal connecting portion is partitioned from a harness insertion area within the housing portion by the partition wall portion.

According to a wire harness protector having a structure according to this aspect, the ground terminal connecting portion is partitioned from the harness insertion area within the housing portion by the partition wall portion, so it is possible to reduce the risk that a tool will interfere with the wire harness and the wire harness will be damaged during work to assemble the ground terminal branched to extend from the wire harness with the ground terminal connecting portion. Also, even when fastening with a nut or the like after the ground terminal connecting portion and the ground terminal have been connected, it is possible to reduce the risk that an electric wire or the like used to configure the wire harness will be pinched.

In a fifth aspect, there is provided the wire harness protector having a grounding function according to the first to fourth aspects, an opening window enabling the ground terminal connecting portion to be viewed from outside is provided in the protector main body.

According to a wire harness protector having a structure according to this aspect, the ground terminal connecting portion can be viewed from outside through the opening window, so even after manufacturing the wire harness protector, it is possible to confirm whether the ground terminal and the ground terminal connecting portion are correctly connected.

According to an embodiment of the wire harness protector with a grounding function, the ground terminal connecting portion includes a bolt-like portion protruding into the housing portion, so by placing the ground terminal over the bolt-like portion, the ground terminal and the ground terminal connecting portion can be easily and more reliably connected. Therefore, it is possible to effectively improve the assembly work efficiency in the connection of the ground terminal to the ground terminal connecting portion, and possible to stabilize and suppress poor contact points.

DRAWINGS

DESCRIPTION

Figure 1:
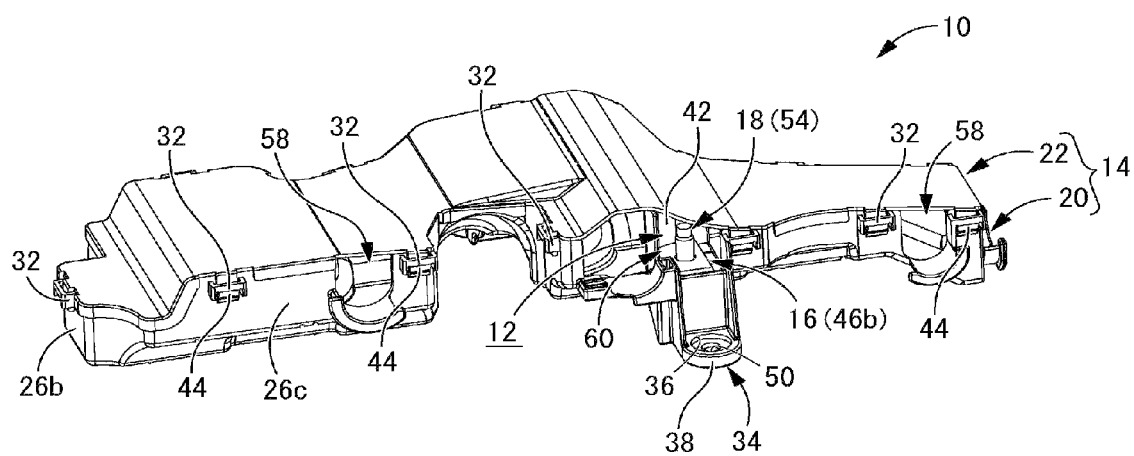
FIG. 1 is a perspective view that shows a wire harness protector having a grounding function according to one embodiment.
Figure 2:
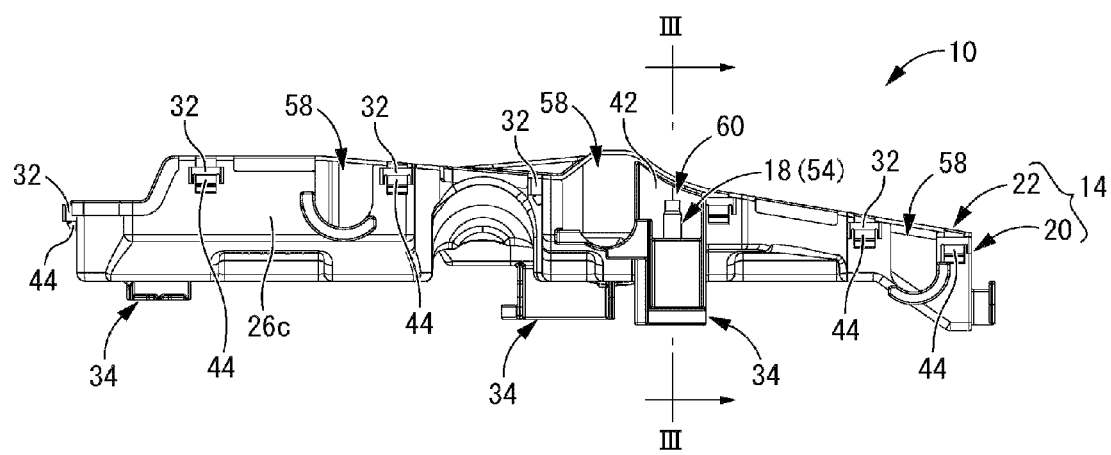
FIG. 2 is a front view of the wire harness protector shown in FIG. 1.

Below, embodiments of the present design will be described with reference to the drawings.

First, a wire harness protector (referred to below as a protector) 10 having a grounding function is shown in FIGS. 1 to 4 as one embodiment of the present design. This protector 10 is provided with a protector main body 14 that has a housing portion 12 where a wire harness can be housed, and a conductive metal fitting 16 is provided in the protector main body 14. Also, one end portion of the conductive metal fitting 16 is configured to be fixed to a vehicle body 17, and a ground terminal connecting portion 18 protrudes from another end portion. By connecting a ground terminal that extends outward from the wire harness to the ground terminal connecting portion 18, the wire harness can be protected by the protector 10, and can form a grounded connection to the vehicle body 17. Note that in the following description, the vertical direction refers to the direction in which the ground terminal connecting portion 18 extends outward, and is the vertical direction in FIG. 3. Also, a tip end side refers to the left side in FIG. 2 which is the side where an end portion of the wire harness is positioned, and a base end side refers to the right side in FIG. 2.

In more detail, the protector main body 14 as a whole has a horizontally-directed approximately cylindrical shape with a bottom, and is configured with a main body lower portion 20 having an approximately gutter-like shape that opens upward, and a lid body 22 that covers the main body lower portion 20 from above.

Figure 5:
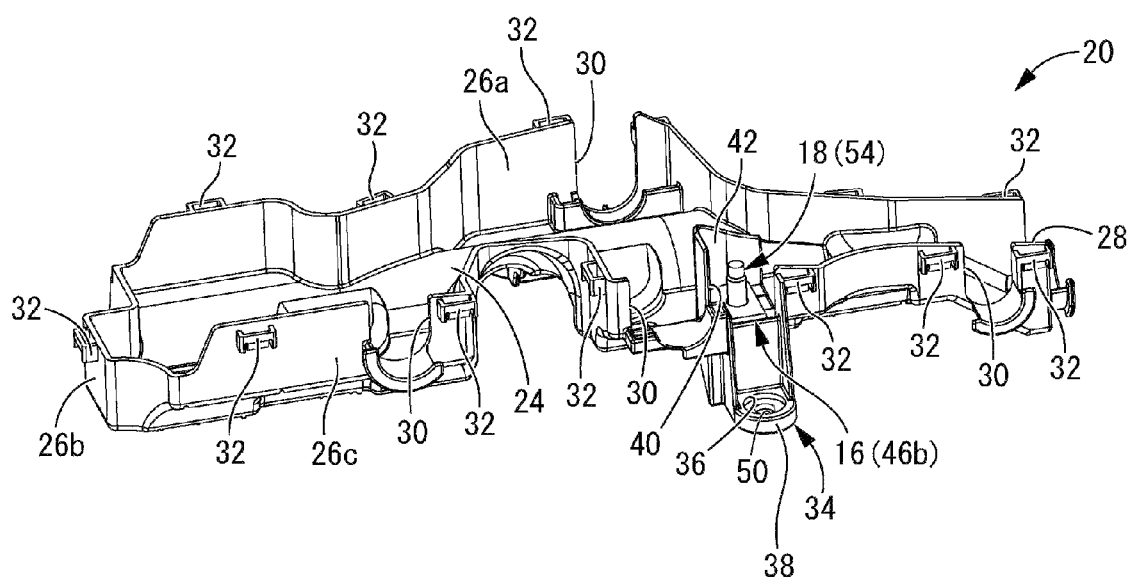
FIG. 5 is a perspective view that shows a main body lower portion in the configuration of the wire harness protector shown in FIG. 1.
Figure 6:
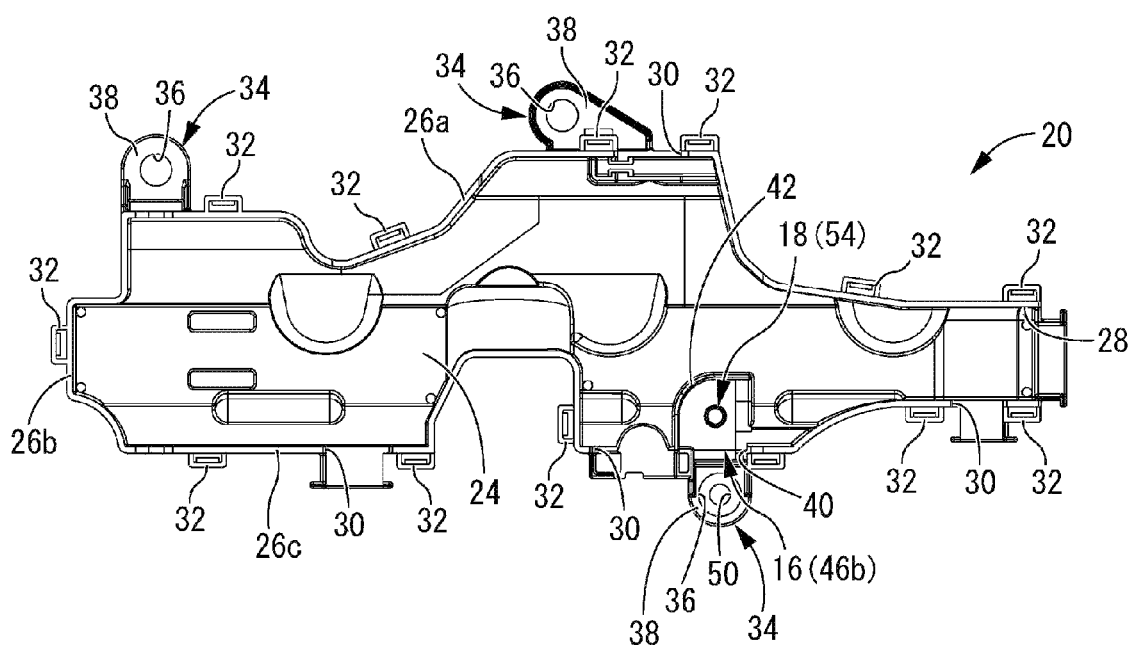
FIG. 6 is a plan view of the main body lower portion shown in FIG. 5.

That is, as shown in FIGS. 5 and 6, the main body lower portion 20 is provided with a bottom wall 24 that extends in approximately the horizontal direction (the left-right direction in FIG. 3), and a circumferential wall 26 that protrudes upward from an edge of the bottom wall 24. This circumferential wall 26 has an opening portion 28 at the base end side, that is, the circumferential wall 26 is configured with a circumferential wall 26a provided above in FIG. 6, a circumferential wall 26b provided to the left side in FIG. 6, and a circumferential wall 26c provided below in FIG. 6. Note that in the present embodiment, notches 30 that open upward are formed at a plurality of locations in the circumferential wall 26a and the circumferential wall 26c. Also, a plurality of lock-receiving portions 32 that protrude outward are provided in the outer circumferential face of the circumferential walls 26a, 26b, and 26c.

Further, a plurality of vehicle fixing portions 34 are provided protruding from the outer circumferential face of the main body lower portion 20, and in the present embodiment, three of the vehicle fixing portions 34 are provided. These vehicle fixing portions 34 are each configured from a fixing plate portion 38 that extends horizontally and has a bolt insertion hole 36 in the center, and in the present embodiment, the fixing plate portion 38 is positioned lower than the bottom wall 24.

Further, in the present embodiment, a notch 40 that opens upward is formed in the circumferential wall 26c at the forming position of one vehicle fixing portion 34 (the vehicle fixing portion 34 provided below in FIG. 6). Also, a partition wall portion 42 is provided and erected to the inside in the width direction (the vertical direction in FIG. 6) of the bottom wall 24 relative to the notch 40. This partition wall portion 42 has a shape such that plate-like bodies that extend in the left-right direction in FIG. 6 and in the vertical direction in FIG. 6 are connected with a curving plate-like body, and such that an area adjacent to a harness insertion area 64 described later, where the ground terminal connecting portion 18 is provided, is surrounded by the partition wall portion 42.

On the other hand, the lid body 22 as a whole has a shape extending in approximately the horizontal direction, and in a plan view, has approximately the same shape as the bottom wall 24. Also, from edges of the lid body 22, a plurality of lock portions 44 that protrude downward are provided at positions corresponding to the lock-receiving portions 32.

Note that the main body lower portion 20 and the lid body 22 formed with the shape as described above can be suitably formed by injection molding or the like using a hard synthetic resin material, for example.

Figure 3:
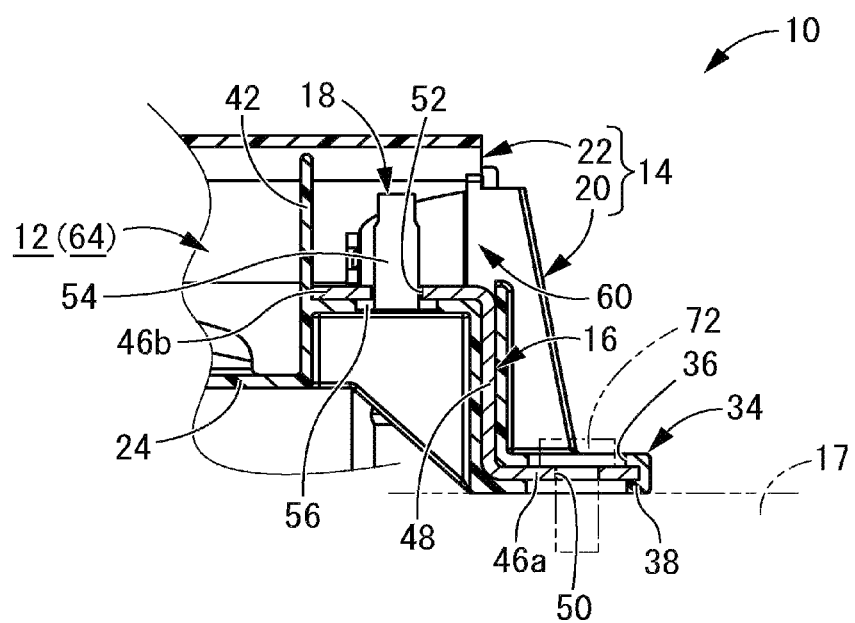
FIG. 3 is a cross-sectional view showing an enlarged view of principal parts of cross-section III in FIG. 2.
Figure 4:
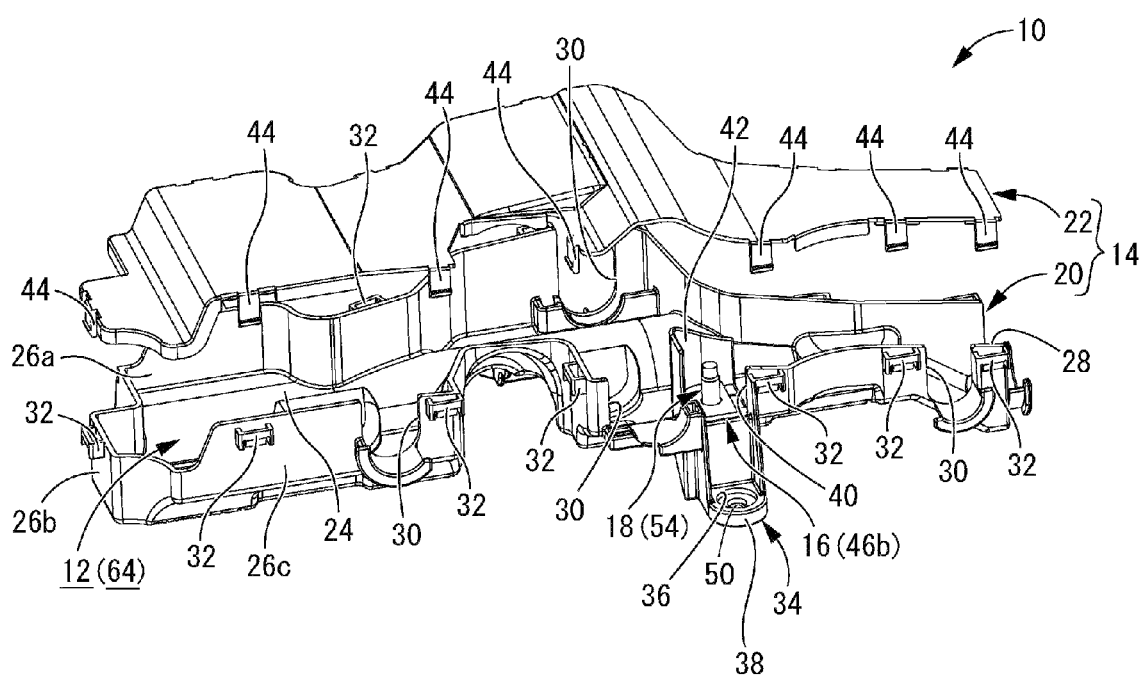
FIG. 4 is an exploded perspective view of the wire harness protector shown in FIG. 1.

Here, the conductive metal fitting 16 is provided in the main body lower portion 20 of the protector main body 14. This conductive metal fitting 16 is formed by performing pressing or the like on a metallic plate in an approximately rectangular shape, for example, and for example, a conductive material such as iron, aluminum, or copper can be adopted. Also, as shown in FIG. 3 for example, end portions 46*a* and 46*b* of the conductive metal fitting 16 respectively extend in the horizontal direction, and these end portions 46*a* and 46*b* are connected to each other by a vertical wall portion 48 that extends in the vertical direction (up-down direction). Also, bolt insertion holes 50 and 52 are formed penetrating through approximately the center portion of each of these end portions 46*a* and 46*b*. Also, the one end portion 46*a* of the conductive metal fitting 16 overlaps the vehicle fixing portion 34 provided below in FIG. 6, and the bolt insertion hole 36 of the vehicle fixing portion 34 and the bolt insertion hole 50 in the center of the one end portion 46*a* are provided at positions that overlap in a plan view. On the other hand, the other end portion 46*b* of the conductive metal fitting 16 is positioned, above the bottom wall 24, to the inside in the width direction relative to the vehicle fixing portion 34 provided below in FIG. 6, and in an area surrounded by the partition wall portion 42.

Also, the ground terminal connecting portion 18 is provided in the other end portion 46*b* of the conductive metal fitting 16. This ground terminal connecting portion 18 is configured with a bolt-like portion that protrudes upward from the other end portion 46*b* of the conductive metal fitting 16, and in the present embodiment, is configured including a stud bolt 54. That is, a bolt having a screw portion at both ends is inserted from below into the bolt insertion hole 52 of the other end portion 46*b*, and a nut 56 is attached by screwing to the screw portion at the lower end of the bolt. By this stud bolt 54 and/or the nut 56 contacting the other end portion 46*b* of the conductive metal fitting 16, the ground terminal connecting portion 18 and the conductive metal fitting 16 are electrically connected. Note that the tip of the stud bolt 54 that protrudes upward has a size so as to not reach the lid body 22 when the lid body 22 has been assembled to the main body lower portion 20, and at this time the ground terminal connecting portion 18 protrudes into the housing portion 12.

Note that in the present embodiment, the conductive metal fitting 16, the stud bolt 54, and the nut 56 are formed as a single body by insert molding so as to be embedded in the main body lower portion 20. That is, the one end portion 46*a* of the conductive metal fitting 16 and the vertical wall portion 48 are sandwiched by the bottom wall 24 and the vehicle fixing portion 34 on both sides in the plate thickness direction, and the other end portion 46*b* of the conductive metal fitting 16 is exposed on the bottom wall 24. Also, the ground terminal connecting portion 18 configured using the stud bolt 54 penetrates from the bottom wall 24 through the other end portion 46*b* of the conductive metal fitting 16, and protrudes upward.

The protector 10 of the present embodiment is configured by the lid body 22 being overlaid from above on the main body lower portion 20 formed with the shape as described above, and each lock portion 44 engaging with each lock-receiving portion 32. Thus, the upward-opening portions of the main body lower portion 20 are covered by the lid body 22, the protector main body 14 has a horizontally-directed approximately cylindrical shape with a bottom and having the opening portion 28 at the base end side, and the housing portion 12 is formed within the protector main body 14.

Also, due to the upward-opening portion of the notches 30 provided in the circumferential walls 26*a* and 26*c* being covered by the lid body 22, a harness insertion hole 58 is formed in the protector main body 14, and the housing portion 12 is in communication with external space through the harness insertion hole 58. Also, by the upward-opening portion of the notch 40 provided in the circumferential wall 26*c* being covered by the lid body 22, an opening window 60 is formed in the protector main body 14, and the ground terminal connecting portion 18 can be viewed from outside through the opening window 60.

Figure 7:
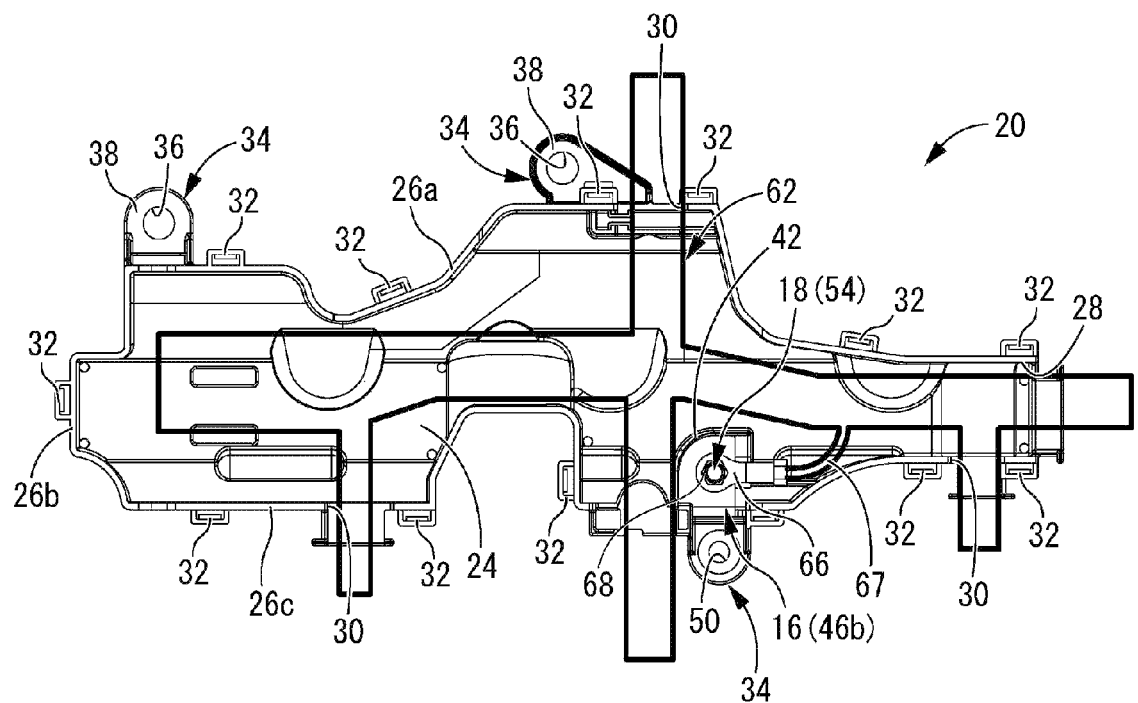
FIG. 7 is an explanatory drawing for explaining a routing mode of a wire harness in the wire harness protector shown in FIG. 1.

As shown in FIG. 7, a wire harness 62 is inserted through and housed in the protector 10 that has been formed as described above. Note that in FIG. 7, the external shape of the wire harness 62 is indicated by bold lines. In this wire harness 62, for example, one end portion is extended to outside of the protector 10 through the opening portion 28 of the housing portion 12 or the harness insertion hole 58 on the base end side, and another end portion is positioned at the tip end side of the housing portion 12, or is positioned to outside of the protector 10 through the harness insertion hole 58 on the tip end side. That is, in the housing portion 12, a harness insertion area 64 is an area from the opening portion 28 or the harness insertion hole 58 on the base end side, to the tip end of the housing portion 12 or the harness insertion hole 58 on the tip end side.

The ground terminal connecting portion 18 that protrudes from the bottom wall 24 into the housing portion 12 is partitioned from the harness insertion area 64 by the partition wall portion 42. Specifically, the partition wall portion 42 is provided leftward and upward in FIG. 7 from the ground terminal connecting portion 18 to partition the ground terminal connecting portion 18 from the harness insertion area 64, but a partition wall portion is not provided rightward in FIG. 7 from the ground terminal connecting portion 18, so the space where the ground terminal connecting portion 18 is provided is in communication with the harness insertion area 64.

Figure 8:
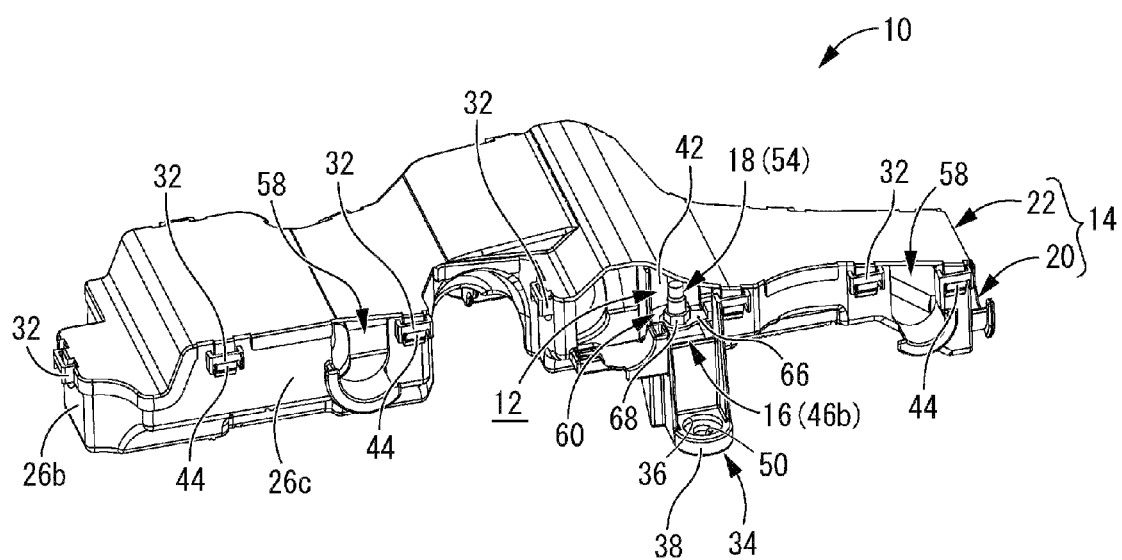
FIG. 8 is an explanatory drawing that illustrates a state in which a ground terminal has been connected to a ground terminal connecting portion in the wire harness protector shown in FIG. 1.

Here, a ground terminal 66 extends in a branched manner from the wire harness 62. That is, a ground wire 67 is extended out from a bundle of electric wire used to configure the wire harness 62, and the ground terminal 66 is provided at a tip end of the ground wire 67. The ground wire 67 is extended within the housing portion 12 so as to circle around and into the partition wall portion 42, and the ground terminal 66 provided at the tip end of the ground wire 67 is connected to the ground terminal connecting portion 18. In the present embodiment, the ground terminal 66 is a round ring terminal, and as shown in FIG. 8, the ground terminal 66 is placed over the ground terminal connecting portion 18, and by a nut 68 being attached by screwing to the upper screw portion of the ground terminal connecting portion 18 (the stud bolt 54), the ground terminal 66 is connected to the ground terminal connecting portion 18. Note that in FIG. 8, portions of the wire harness other than the ground terminal 66 are not shown.

In a state as described above in which the wire harness 62 is housed in the harness insertion area 64 within the housing portion 12, and the ground terminal 66 has been connected to the ground terminal connecting portion 18, the vehicle fixing portion 34 and the vehicle body 17 are overlapped and a bolt 72 (see FIG. 3) is inserted through the bolt insertion hole 36. Thus, the protector 10 of the present embodiment is attached to the vehicle body 17. At this time, the bolt 72 is also inserted through the bolt insertion hole 50 of the one end portion 46a of the conductive metal fitting 16 along with the bolt insertion hole 36 of the vehicle fixing portion 34 to fix the protector 10 to the vehicle with the bolt 72, so the conductive metal fitting 16 is electrically connected to the vehicle body 17 through the bolt 72.

Thus, the ground terminal 66 is electrically connected to the vehicle body 17 through the ground terminal connecting portion 18, the conductive metal fitting 16, and the bolt 72, so vehicle grounding is realized.

In the wire harness protector 10 having a grounding function of the present embodiment, structured as described above, the ground terminal connecting portion 18 is configured to include the stud bolt 54, and the ground terminal 66 has a ring terminal shape, so by placing the ground terminal 66 over the ground terminal connecting portion 18 and attaching the nut 68 by screwing, the ground terminal 66 and the ground terminal connecting portion 18 can be easily and reliably connected. Thus, it is possible to effectively improve work efficiency in the work of connecting the ground terminal 66 and the ground terminal connecting portion 18, and it is possible to reduce the risk of poor contact points that occur when a stable connection has not been made.

Also, the conductive metal fitting 16 and the ground terminal connecting portion 18 (the stud bolt 54 and the nut 56) are formed by insert molding to the main body lower portion 20, so it is possible to reduce the risk of the conductive metal fitting 16 or the ground terminal connecting portion 18 dropping out from the protector 10 due to vibration or the like during transport or the like of the protector 10.

In particular, because the vertical wall portion 48 is provided in the conductive metal fitting 16, by adopting insert molding, the vertical wall portion 48 is sandwiched by the bottom wall 24 and the vehicle fixing portion 34 on both sides in the plate thickness direction. Thus, it is possible to avoid applying rotational torque to the other end portion 46b of the conductive metal fitting 16 when the bolt 72 is inserted through the bolt insertion hole 36 and the bolt insertion hole 50 and attached by screwing to the vehicle body 17. Accordingly, it is possible to effectively prevent affecting the connection between the ground terminal 66 and the ground terminal connecting portion 18 when installing the protector 10 to the vehicle body 17.

Also, the partition wall portion 42 is provided in the surroundings of the ground terminal connecting portion 18 to partition the ground terminal connecting portion 18 from the wire harness insertion area 64, so it is possible to reduce the risk of damaging the wire harness 62, or pinching the wire harness 62 with a tool or the like, when connecting the ground terminal 66 and the ground terminal connecting portion 18 or when attaching the nut 68 by screwing to the ground terminal connecting portion 18 (the stud bolt 54).

Further, the opening window 60 that enables the ground terminal connecting portion 18 to be viewed from outside is formed in the protector main body 14, so after manufacturing the protector 10, it is possible to easily confirm, for example without detaching the lid body 22 from the main body lower portion 20, whether the ground terminal 66 and the ground terminal connecting portion 18 are connected in a proper state.

Above, embodiments of the present invention were described, but the present invention is not to be interpreted as limited by the specific description of these embodiments, and other embodiments having various modifications, revisions, improvements, or the like added based on the knowledge of a person having ordinary skill in the art are also possible.

For example, in the above embodiment, a bolt-like portion was configured using the stud bolt 54, and inserted from below the conductive metal fitting 16, but it is not necessary for the bolt-like portion and the conductive metal fitting to be separate bodies; a conductive metal fitting may also be adopted in which the bolt-like portion is provided integrated with the conductive metal fitting as a single body. Note that in this case as well, it is suitable that a screw portion is provided at the tip end of the bolt-like portion, and by attaching a nut by screwing using this screw portion, a ground terminal can be stably connected.

Also, in the above embodiment, the conductive metal fitting 16 and the stud bolt 54 were formed as a single body by insert molding to the main body lower portion 20, but this is not a limitation. That is, a conductive metal fitting and a stud bolt may be later affixed after manufacturing the main body lower portion, for example.

Further, the conductive metal fitting is not limited to the shape in the above-described embodiment, and can be designed to match the shape of a protector main body or the like. That is, for example, the vertical wall portion 48 is not essential, and the conductive metal fitting, for example, may have a plate-like shape that extends in the horizontal direction.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A wire harness protector having a grounding function, comprising:
   a protector main body having a housing portion where a wire harness can be inserted and housed;
   a vehicle fixing portion protruding from the protector main body; and
   a conductive metal fitting having one end portion that is configured to be fixed by bolting to the vehicle fixing portion and also to a vehicle body, and having another end portion that is opposite the one end portion and includes a ground terminal connecting portion;
   the wire harness protector being configured such that a ground terminal branched to extend from the wire harness can be connected to the ground terminal connecting portion;
   wherein the ground terminal connecting portion includes a bolt-like portion that protrudes into the housing portion such that the ground terminal branch can be connected to the ground terminal connecting portion within the protector main body.

2. The wire harness protector according to claim 1, wherein the conductive metal fitting and the bolt-like portion are insert molded to the protector main body.

3. The wire harness protector according to claim 2, wherein the one end portion of the conductive metal fitting extends in a horizontal direction and the other end portion of the conductive metal fitting extends in the horizontal direction, and the one end portion and the other end portion are connected by a vertical wall portion that extends in a vertical direction.

4. The wire harness protector according to claim 3, wherein a partition wall portion is provided in the surroundings of the ground terminal connecting portion, and the ground terminal connecting portion is partitioned from a harness insertion area within the housing portion by the partition wall portion.

5. The wire harness protector according to claim 3, wherein an opening window enabling the ground terminal connecting portion to be viewed from outside is provided in the protector main body.

6. The wire harness protector according to claim 2, wherein a partition wall portion is provided in the surroundings of the ground terminal connecting portion, and the ground terminal connecting portion is partitioned from a harness insertion area within the housing portion by the partition wall portion.

7. The wire harness protector according to claim 2, wherein an opening window enabling the ground terminal connecting portion to be viewed from outside is provided in the protector main body.

8. The wire harness protector according to claim 1, wherein a partition wall portion is provided in the surroundings of the ground terminal connecting portion, and the ground terminal connecting portion is partitioned from a harness insertion area within the housing portion by the partition wall portion.

9. The wire harness protector according to claim 8, wherein an opening window enabling the ground terminal connecting portion to be viewed from outside is provided in the protector main body.

10. The wire harness protector according to claim 1, wherein an opening window enabling the ground terminal connecting portion to be viewed from outside is provided in the protector main body.

* * * * *